United States Patent
Xiao et al.

(10) Patent No.: US 8,109,091 B2
(45) Date of Patent: Feb. 7, 2012

(54) EXHAUST GAS RECIRCULATION CONTROL SYSTEMS AND METHODS

(75) Inventors: Yun Xiao, Ann Arbor, MI (US); Kouji Sakumoto, Ayase (JP)

(73) Assignee: GM Global Technology Operations LLC

(*) Notice: Subject to any disclaimer, the term of this patent is extended or adjusted under 35 U.S.C. 154(b) by 543 days.

(21) Appl. No.: 12/191,381

(22) Filed: Aug. 14, 2008

(65) Prior Publication Data

US 2009/0288413 A1    Nov. 26, 2009

Related U.S. Application Data

(60) Provisional application No. 61/055,268, filed on May 22, 2008.

(51) Int. Cl.
- *F02B 33/44* (2006.01)
- *F02B 47/08* (2006.01)
- *F02M 25/07* (2006.01)
- *B60K 13/04* (2006.01)

(52) U.S. Cl. .............. 60/605.2; 123/568.21; 701/108; 701/114; 180/309

(58) Field of Classification Search .............. 60/605.2; 123/568.16, 568.21; 701/99, 108, 114; 180/309
See application file for complete search history.

(56) References Cited

U.S. PATENT DOCUMENTS

| | | | | |
|---|---|---|---|---|
| 6,457,461 | B1* | 10/2002 | Romzek | 123/568.16 |
| 6,954,693 | B2* | 10/2005 | Brackney et al. | 701/109 |
| 6,993,908 | B2* | 2/2006 | Akao et al. | 60/605.2 |
| 7,593,828 | B2* | 9/2009 | Wang et al. | 702/138 |
| 7,693,645 | B2* | 4/2010 | Nam | 701/108 |
| 2002/0144674 | A1* | 10/2002 | Wang et al. | 123/568.21 |
| 2003/0178002 | A1* | 9/2003 | Israel et al. | 60/605.2 |
| 2006/0288701 | A1* | 12/2006 | Ramamurthy et al. | 60/605.2 |
| 2007/0169478 | A1 | 7/2007 | Sterner et al. | |
| 2007/0169763 | A1 | 7/2007 | Kawai et al. | |
| 2008/0078176 | A1* | 4/2008 | de Ojeda | 60/605.2 |
| 2008/0223036 | A1* | 9/2008 | Hara et al. | 60/605.2 |
| 2009/0132153 | A1* | 5/2009 | Shutty et al. | 701/108 |

FOREIGN PATENT DOCUMENTS

| | | |
|---|---|---|
| CN | 1651731 (A) | 8/2005 |
| DE | 102005004832 | 9/2005 |
| DE | 102005004832 A1 * | 9/2005 |
| DE | 102006003539 | 4/2007 |
| EP | 1744035 A1 * | 1/2007 |

* cited by examiner

*Primary Examiner* — Mary A Davis

(57) ABSTRACT

An exhaust gas recirculation control system comprises a pressure condition evaluation module and a protection module. The pressure condition evaluation module evaluates at least one of vane movement of a turbocharger and engine pressure. The protection module selectively controls an exhaust gas recirculation valve based on the at least one of the vane movement of the turbocharger and the engine pressure.

18 Claims, 3 Drawing Sheets

EXHAUST GAS RECIRCULATION CONTROL SYSTEMS AND METHODS

CROSS-REFERENCE TO RELATED APPLICATIONS

This application claims the benefit of U.S. Provisional Application No. 61/055,268, filed on May 22, 2008. The disclosure of the above application is incorporated herein by reference.

FIELD

The present disclosure relates to methods and systems for controlling an exhaust gas recirculation valve for internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Turbocharged engines commonly include an exhaust driven turbocharger that increases engine output by increasing airflow to the cylinders. As a result, turbocharged engines provide increased horsepower over equivalently sized naturally aspirated engines.

One turbocharger design includes a variable nozzle turbocharger (VNT). VNT's include variable position vanes that regulate the amount of air delivered through the VNT. The vane position ranges from a fully-open position to a fully-closed position. In the fully-closed position, the VNT delivers a maximum amount of airflow to the engine. In the fully-open position, the VNT delivers a minimum amount of airflow to the engine. The vanes can be positioned between the fully-open and fully-closed positions to provide an intermediate amount of airflow to the engine. A vane actuator adjusts the vane position based on a control signal and a vane position sensor generates a signal indicating the actual vane position for feedback control.

During high temperature conditions and/or high back pressure conditions, movement of the vanes can be inhibited. Such conditions can negatively impact the performance of the turbocharger and the overall performance of the engine system.

SUMMARY

Accordingly, an exhaust gas recirculation control system comprises a pressure condition evaluation module and a protection module. The pressure condition evaluation module evaluates at least one of vane movement of a turbocharger and engine pressure. The protection module selectively controls an exhaust gas recirculation valve based on the at least one of the vane movement of the turbocharger and the engine pressure.

In other features, the pressure condition evaluation module evaluates the at least one of the vane movement of the turbocharger and the engine pressure to detect at least one of slow vane movement and a vane jam event.

In still other features, the protection module selectively controls the exhaust gas recirculation valve to protect the turbocharger when at least one of turbocharger overboost, engine overspeed, and cylinder pressure is greater than a respective threshold.

In further features, the exhaust gas recirculation control system further comprises an enable module. The enable module enables the pressure condition evaluation module to evaluate the at least one of the vane movement and the engine pressure based on at least one of engine speed, engine load, and engine temperature.

In still further features, the engine temperature is based on engine coolant temperature.

In other features, the pressure condition evaluation module evaluates the vane movement of the turbocharger based on a turbocharger control command, a current signal, and turbocharger position.

In still other features, the pressure condition evaluation module evaluates the engine pressure based on boost pressure.

In further features, the pressure condition evaluation module evaluates the engine pressure conditions based on a pressure sensor signal from at least one of a back pressure sensor and a turbine inlet pressure sensor.

In still further features, the protection module selectively controls regeneration of a particulate filter based on the selectively controlling of the exhaust gas recirculation valve.

In other features, the protection module selectively controls an exhaust brake booster based on the selectively controlling of the exhaust gas recirculation valve.

A method of controlling an exhaust gas recirculation control system comprises evaluating at least one of vane movement of a turbocharger and engine pressure and selectively controlling an exhaust gas recirculation valve based on the at least one of the vane movement of the turbocharger and the engine pressure.

In other features, the evaluating further comprises evaluating the at least one of the vane movement of the turbocharger and the engine pressure to detect at least one of slow vane movement and a vane jam event.

In still other features, the selectively controlling the exhaust gas recirculation valve comprises selectively controlling the exhaust gas recirculation valve to protect the turbocharger when at least one of turbocharger over boost, engine over speed, and cylinder pressure greater than a respective threshold.

In further features, the method further comprises enabling the pressure condition evaluation module to evaluate the at least one of the vane movement and the engine pressure based on at least one of engine speed, engine load, and engine temperature.

In still further features, the method further comprises determining the engine temperature based on engine coolant temperature.

In other features, the evaluating the vane movement of the turbocharger is based on a turbocharger control command, a current signal, and turbocharger position.

In still other features, the evaluating the engine pressure is based on boost pressure.

In further features, the evaluating the engine pressure is based on a pressure sensor signal from at least one of a back pressure sensor and a turbine inlet pressure sensor.

In other features, the method further comprises selectively controlling regeneration of a particulate filter based on the selectively controlling of the exhaust gas recirculation valve.

In still other features, the method further comprises selectively controlling exhaust brake booster based on the selectively controlling of the exhaust gas recirculation valve.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
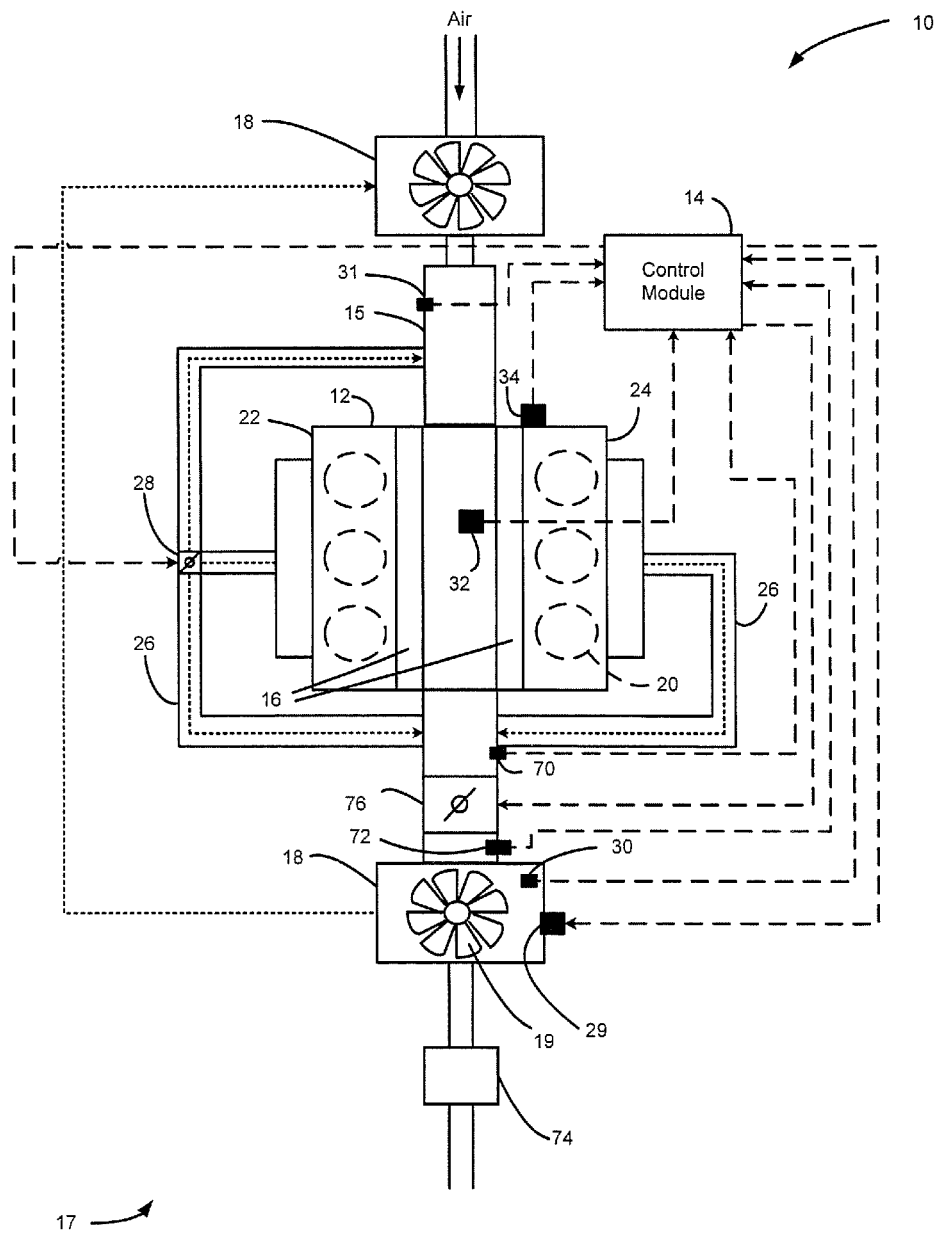
FIG. 1 is a functional block diagram of an engine system including an exhaust gas recirculation control system according to various aspects of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine control system 10 is shown. The engine control system 10 includes an engine 12 and a control module 14. The engine 12 further includes an intake manifold 15, a fuel injection system 16, an exhaust system 17 and a turbocharger 18. The exemplary engine 12 includes six cylinders 20 configured in adjacent cylinder banks 22, 24 in a V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration.

Air is drawn into the intake manifold 15 by the inlet vacuum created by the engine intake stroke. Air is drawn into the individual cylinders 20 from the intake manifold 15 and is compressed therein. Fuel is injected by the fuel injection system 16 and is mixed with air. The air/fuel mixture is compressed, and the heat of compression and/or electrical energy ignites the air/fuel mixture. Exhaust gas is exhausted from the cylinders 20 through exhaust conduits 26. The exhaust gas drives the turbocharger 18. The turbocharger 18 delivers additional air (boost) to the intake manifold 15. An exhaust gas recirculation (EGR) valve 28 is selectively controlled, as will be discussed in more detail below, to re-circulate a portion of the exhaust back into the intake manifold 15.

The turbocharger 18 is preferably a variable nozzle turbocharger (VNT). The turbocharger 18 includes a plurality of variable position vanes 19 that regulate the amount of air delivered to the engine 12 based on a signal from the control module 14. More specifically, the vanes 19 are movable between a fully-open position and a fully-closed position. When the vanes 19 are in the fully-closed position, the turbocharger 18 delivers a maximum amount of air into the intake manifold 15 and consequently into the engine 12. When the vanes 19 are in the fully-open position, the turbocharger 18 delivers a minimum amount of air into the engine 12. The amount of delivered air is regulated by selectively positioning the vanes 19 between the fully-open and fully-closed positions.

The turbocharger 18 includes an electronic control vane solenoid 29 that manipulates a flow of hydraulic fluid to a vane actuator (not shown). The vane actuator controls the position of the vanes 19. A vane position sensor 30 generates a vane position signal based on the physical position of the vanes 19. A boost sensor 31 generates a boost signal based on the additional air delivered to the intake manifold 15 by the turbocharger 18. While the turbocharger implemented herein is described as a VNT, it is contemplated that other turbochargers employing electronic control methods may be employed.

The control module 14 controls operation of the engine system 10 based on various sensed and/or modeled parameters such as, for example, engine speed, coolant temperature, turbine position, and boost pressure. In various embodiments, an engine speed sensor 32 generates an engine speed signal. A coolant temperature sensor 34 generates a coolant temperature signal. Based on the parameters, the control module 14 regulates operation of the turbocharger 18 by regulating current to the vane solenoid 29. The control module 14 also selectively controls the opening and closing of the EGR valve 28 to protect the turbocharger 18 during over boost, over speed, and excessive peak cylinder pressure conditions when the vanes 19 are moving slowly or are jammed (stopped).

Figure 2:
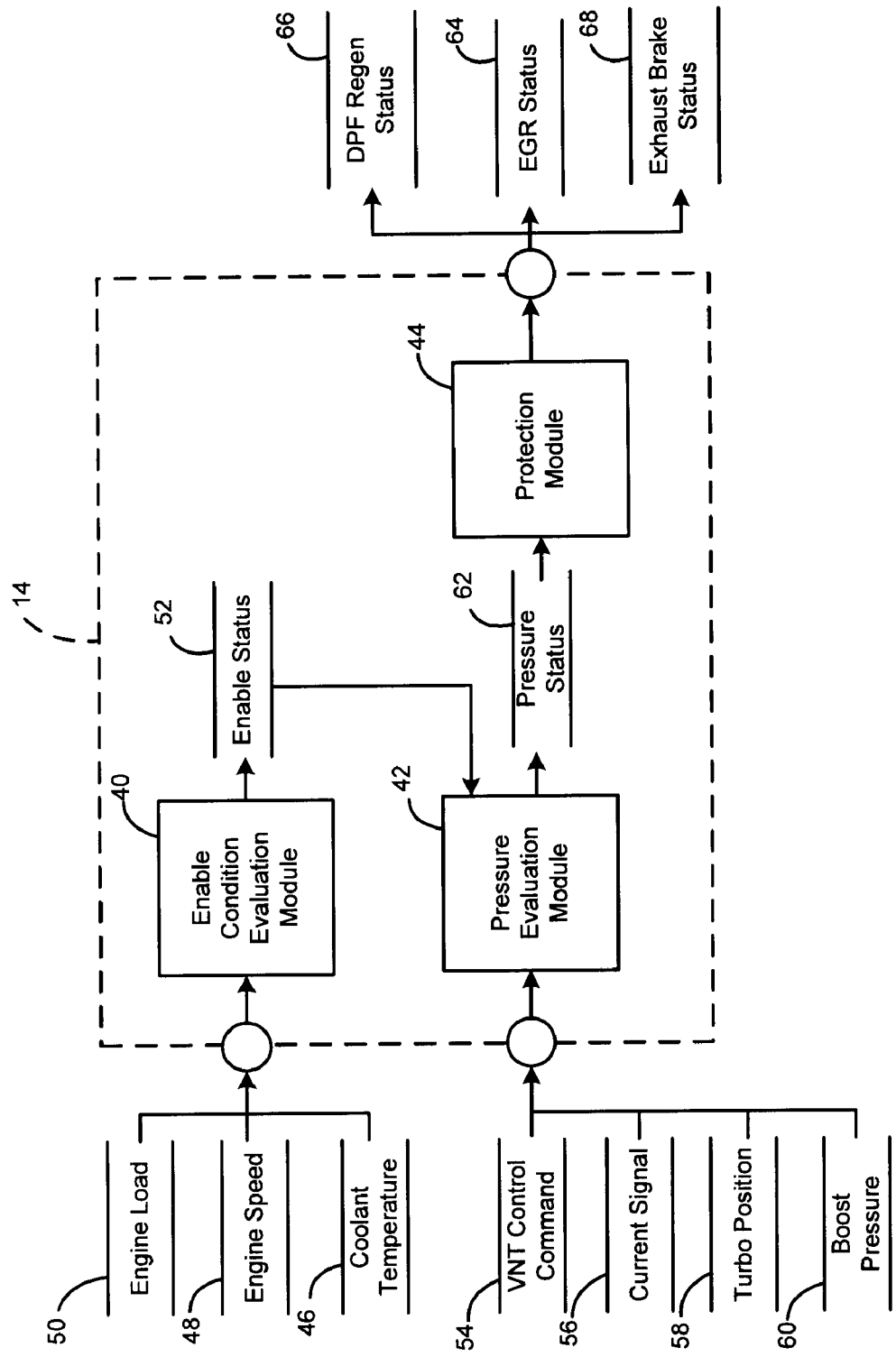
FIG. 2 is a dataflow diagram illustrating an exhaust gas recirculation control system according to various aspects of the present disclosure.

In particular, as shown in FIG. 2, a dataflow diagram illustrates various embodiments of an exhaust gas recirculation control system that may be embedded within the control module 14. Various embodiments of exhaust gas recirculation control systems according to the present disclosure may include any number of sub-modules embedded within the control module 14. As can be appreciated, the sub-modules shown may be combined and/or further partitioned to similarly control the EGR valve 28 (FIG. 1) to protect the turbocharger 18 (FIG. 1). As previously discussed, inputs to the system may be sensed from the engine system 10 (FIG. 1), received from other control modules (not shown), and/or determined by other sub-modules (not shown) within the control module 14. In various embodiments, the control module of FIG. 2 includes an enable condition evaluation module 40, a pressure evaluation module 42, and a protection module 44.

The enable condition evaluation module 40 receives as input, for example, engine coolant temperature 46, engine speed 48, and engine load 50. Based on the inputs 46-50, the enable condition evaluation module 40 evaluates enable conditions to determine whether to enable the exhaust gas recirculation control strategy. For example, the enable condition evaluation module 40 monitors the engine system 10 (FIG. 1) for hot engine conditions, high engine speed conditions, and high load conditions. For example only, a hot engine condition may occur when the engine coolant temperature 46 is greater than a predetermined temperature, such as 225.0° F. A high engine speed condition may occur when, for example, the engine speed 48 is greater than a predetermined speed, such as 2000 RPM. A high load condition may occur when, for example, the engine load 50 is greater than a predetermined load, such as 80% of the maximum engine load.

When hot engine conditions exist, high engine speed conditions exist, and high engine load conditions exist, the enable condition evaluation module 40 sets an enable status 52 to indicate that the exhaust gas recirculation control strategy is enabled (e.g., TRUE). When hot engine conditions do not exist, the engine speed 48 is not high, or the engine load 50 is not high, the enable condition evaluation module 40 sets the enable status 52 to indicate that the exhaust gas recirculation control strategy is disabled (e.g., FALSE)

The pressure evaluation module 42 receives as input, for example, a VNT control command 54, a current signal 56, a turbocharger position 58, and boost pressure 60. The pressure evaluation module 42 determines whether there are excessive pressure conditions and sets a pressure status 62 accordingly.

In various embodiments, the pressure evaluation module 42 evaluates pressure sensor signals from a back pressure sensor 70 or a turbine inlet pressure sensor 72 to determine whether excessive pressure conditions exist. In various other embodiments, if the back pressure sensor 70 and/or the turbine inlet pressure sensor 72 are not present, the excessive pressure conditions can be deduced from the control status of the turbocharger 18.

For example, excessive pressure conditions may be deduced from the VNT control command 54, the current signal 56, a differential between the actual turbocharger position 58 and the target position, and/or the boost pressure 60. For example only, an excessive pressure condition may exist if the VNT control command 54 indicates that a minimum duty cycle is commanded, that a maximum opening of a nozzle vane is commanded, or that a minimum boost capability is commanded. An excessive pressure condition may also exist if the current signal 56 indicates that a minimum current to the actuator solenoid is executed or maximum vane opening force is executed. Additionally, if under the maximum open command and maximum opening force execution, the actual turbocharger position 58 does not follow a target position and a differential between the actual and the target positions is large (e.g., greater than a predetermined maximum) and negative, beyond a normal VNT turbo position response time, an excessive pressure condition may exist. An excessive pressure condition may also exist if the boost pressure is greater than a predetermined pressure, such as 12.0 psi. A pressure status 62 is set to TRUE when an excessive pressure condition exists. Otherwise the pressure status 62 remains set to FALSE.

The protection module 44 receives as input the pressure status 62. When the pressure status 62 indicates that an overpressure condition exists (e.g., is set to TRUE), the protection module 44 determines an amount and a time for controlling the opening of the EGR valve 28 (FIG. 1). In one example, the amount is determined as a function of an overboost level. In another example, the time duration is set to a predetermined value or is determined to be until the vane sticking or overboost goes away.

Opening the EGR valve 28 (FIG. 1) under the slow vane movement and overboost conditions reduces the airflow through the turbocharger 18 (FIG. 1) by circulating part of the exhaust gas to the intake manifold 15 (FIG. 1), and reducing the aerodynamic force acting on the vanes 19 (FIG. 1). Reducing the total exhaust energy to the turbocharger 18 with turbine flow reduction quickly lowers the boost capability and improves the overboost condition. By opening the EGR valve 28 to relieve the exhaust manifold pressure to a lower pressure intake manifold, the excessive back pressure or turbine inlet pressure is reduced which causes bending force on the vane free movement.

In various embodiments, if the engine system includes a diesel particulate filter (DPF) 74 (FIG. 1) and/or an exhaust brake booster 76 (FIG. 1), during the control of the EGR valve 28 (FIG. 1), the protection module 44 controls diesel particulate filter regeneration by setting a DPF regeneration control status 66 and controls exhaust brake modes by setting an exhaust brake mode status 68. The DPF regeneration is prevented from occurring since regeneration has an oil dilution concern with vary late in-cylinder post injection. Similarly, the exhaust braking is prevented from occurring since brake boosting has a braking horse power reduction concern with the opening of the EGR valve 28.

Figure 3:
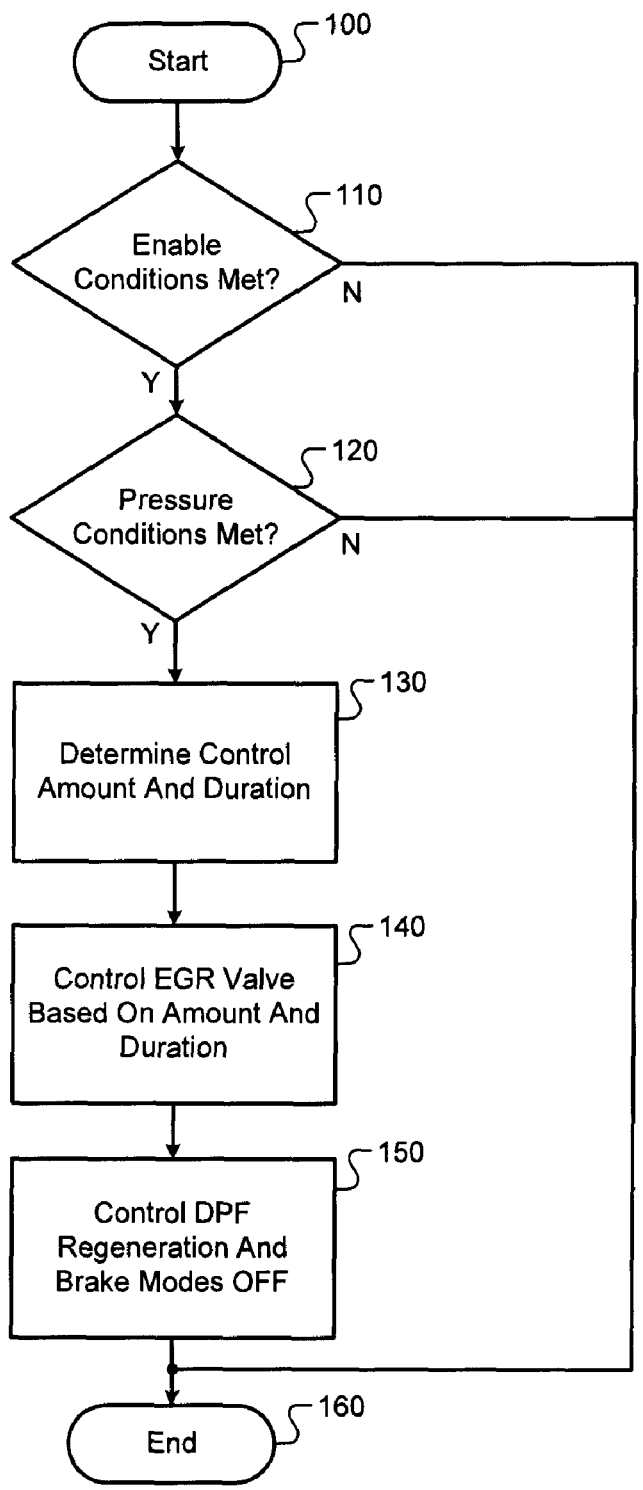
FIG. 3 is a flowchart illustrating an exhaust gas recirculation control method that can be performed by the exhaust gas recirculation control system of FIG. 2 according to various aspects of the present disclosure.

Referring now to FIG. 3, a flowchart illustrates an exhaust gas recirculation control method that can be performed by the exhaust gas recirculation control system in accordance with various aspects of the present disclosure. As can be appreciated, the order of execution of the steps of the exhaust gas recirculation control method can vary without altering the spirit of the method. The method may be performed periodically during operation of the control module 14 or scheduled to run based on certain events.

In one example, the method may begin at 100. The enable conditions as discussed above are evaluated at 110. For example, if hot engine conditions exist, high engine speed conditions exist, and high engine load conditions exist at 110, the method proceeds to evaluate the pressure conditions at 120. Otherwise, if hot engine conditions do not exist, high engine speed conditions do not exist, or high engine load conditions do not exist at 110, the method proceeds to the end at 160.

The pressure conditions are evaluated at 120. If excessive pressure conditions exist at 120, for example, as discussed above, the EGR valve open amount and duration is determined at 130 and the EGR valve is controlled open based on the amount and duration at 140. For example only, the open amount may be a predetermined amount and the EGR valve 28 may be maintained in that position for a predetermined period of time. At 150, DPF regeneration and exhaust braking modes are controlled off to prevent impact on the feature's performance. Thereafter, the method may end at 160.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust gas recirculation control system, comprising:
a pressure condition evaluation module that evaluates at least one of vane movement of a turbocharger and engine pressure to detect at least one of slow vane movement and a vane jam event;
an enable module that enables the pressure condition evaluation module to evaluate the at least one of the vane movement and the engine pressure based on engine speed, engine load, and engine temperature; and
a protection module that selectively controls an exhaust gas recirculation valve based on the at least one of the vane movement of the turbocharger and the engine pressure to protect the turbocharger.

2. The system of claim 1 wherein the protection module selectively controls the exhaust gas recirculation valve to protect the turbocharger when at least one of turbocharger overboost, engine overspeed, and cylinder pressure is greater than a respective threshold.

3. The system of claim 1 wherein the enable module enables the pressure condition evaluation module to evaluate the at least one of the vane movement and the engine pressure when the engine speed is greater than a predetermined speed, the engine load is greater than a predetermined load, and the engine temperature is greater than a predetermined temperature.

4. The system of claim 3 wherein the engine temperature is based on engine coolant temperature.

5. The system of claim 1 wherein the pressure condition evaluation module evaluates the vane movement of the turbocharger based on a turbocharger control command, a current signal, and turbocharger position.

6. The system of claim 1 wherein the pressure condition evaluation module evaluates the engine pressure based on boost pressure.

7. The system of claim 1 wherein the pressure condition evaluation module evaluates the engine pressure based a pressure sensor signal from at least one of a back pressure sensor and a turbine inlet pressure sensor.

8. The system of claim 1 wherein the protection module selectively prevents regeneration of a particulate filter based on the selectively controlling of the exhaust gas recirculation valve.

9. The system of claim 1 wherein the protection module selectively prevents exhaust braking performed using an exhaust brake booster based on the selectively controlling of the exhaust gas recirculation valve.

10. A method of controlling an exhaust gas recirculation control system, comprising:
    evaluating at least one of vane movement of a turbocharger and engine pressure to detect at least one of slow vane movement and a vane lam event;
    enabling the evaluation of the at least one of the vane movement of the turbocharger and the engine pressure based on engine speed, engine load, and engine temperature; and
    selectively controlling an exhaust gas recirculation valve based on the at least one of the vane movement of the turbocharger and the engine pressure to protect the turbocharger.

11. The method of claim 10 wherein the selectively controlling the exhaust gas recirculation valve comprises selectively controlling the exhaust gas recirculation valve to protect the turbocharger when at least one of turbocharger over boost, engine over speed, and cylinder pressure greater than a respective threshold.

12. The method of claim 10 further comprising enabling the evaluation of the at least one of the vane movement and the engine pressure when the engine speed is greater than a predetermined speed, the engine load is greater than a predetermined load, and the engine temperature is greater than a predetermined temperature.

13. The method of claim 12 further comprising determining the engine temperature based on engine coolant temperature.

14. The method of claim 10 wherein the evaluating the vane movement of the turbocharger is based on a turbocharger control command, a current signal, and turbocharger position.

15. The method of claim 10 wherein the evaluating the engine pressure is based on boost pressure.

16. The method of claim 10 wherein the evaluating the engine pressure is based a pressure sensor signal from at least one of a back pressure sensor and a turbine inlet pressure sensor.

17. The method of claim 10 further comprising selectively preventing regeneration of a particulate filter based on the selectively controlling of the exhaust gas recirculation valve.

18. The method of claim 10 further comprising selectively preventing exhaust braking performed using an exhaust brake booster based on the selectively controlling of the exhaust gas recirculation valve.

* * * * *